United States Patent
Deocampo

(10) Patent No.: US 7,874,307 B1
(45) Date of Patent: Jan. 25, 2011

(54) CHECK VALVE AND METHOD OF USE

(76) Inventor: Eduardo R. Deocampo, 2572 Palentina St., Henderson, NV (US) 89044

( * ) Notice: Subject to any disclaimer, the term of this patent is extended or adjusted under 35 U.S.C. 154(b) by 305 days.

(21) Appl. No.: 12/228,991

(22) Filed: Aug. 19, 2008

Related U.S. Application Data

(60) Provisional application No. 60/997,790, filed on Oct. 5, 2007.

(51) Int. Cl.
*F16K 15/03* (2006.01)
(52) U.S. Cl. .............. 137/15.09; 137/515.7; 137/527.8
(58) Field of Classification Search .......... 137/515.7, 137/527, 527.8, 15.09, 15.17
See application file for complete search history.

(56) References Cited

U.S. PATENT DOCUMENTS

| | | | | |
|---|---|---|---|---|
| 80,704 A | * | 8/1868 | Blanding | 137/515.7 |
| 818,670 A | * | 4/1906 | Dumbolton | 137/515.7 |
| 966,390 A | * | 8/1910 | Elder | 137/515.7 |
| 2,068,833 A | * | 1/1937 | White et al. | 137/515.7 |
| 3,066,693 A | * | 12/1962 | Taylor, Jr. | 137/515.7 |
| 3,233,626 A | * | 2/1966 | Hiers et al. | 137/515.7 |
| 3,574,362 A | * | 4/1971 | Gregg et al. | 137/515.7 |
| 3,902,516 A | * | 9/1975 | Rudolph | 137/515.7 |
| 4,274,436 A | * | 6/1981 | Smith | 137/515.7 |
| 4,282,897 A | * | 8/1981 | de Mey, II | 137/515.7 |
| 4,852,607 A | * | 8/1989 | Scaramucci | 137/515.7 |
| 5,117,861 A | * | 6/1992 | McConnell et al. | 137/515.7 |
| 5,713,389 A | * | 2/1998 | Wilson et al. | 137/515.7 |

* cited by examiner

*Primary Examiner*—John Rivell
(74) *Attorney, Agent, or Firm*—Ted Masters

(57) ABSTRACT

A check valve is shaped and dimensioned to be installable inside a conventional pipe coupling, thereby reducing the amount of length required to install the check valve.

2 Claims, 4 Drawing Sheets

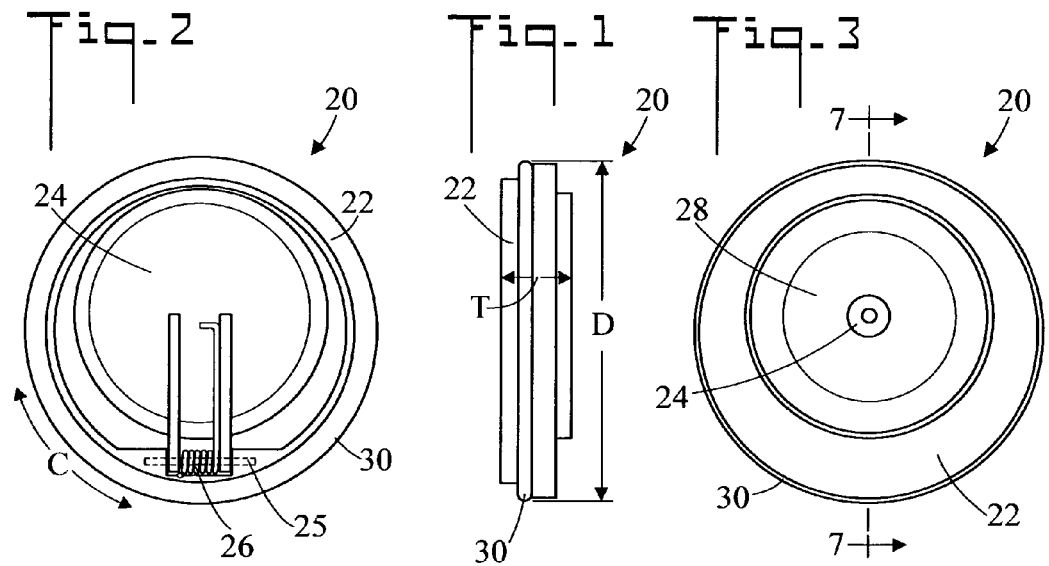
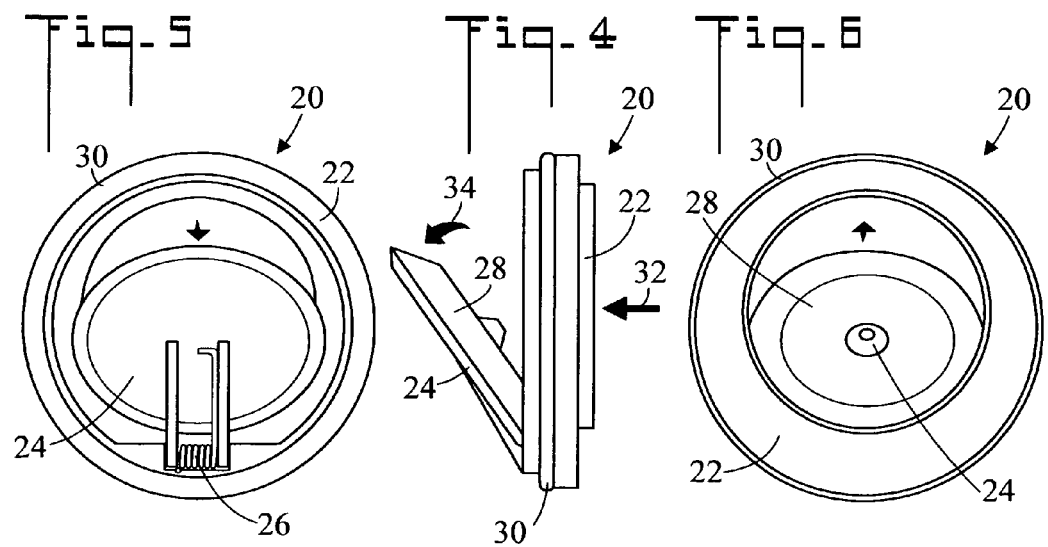

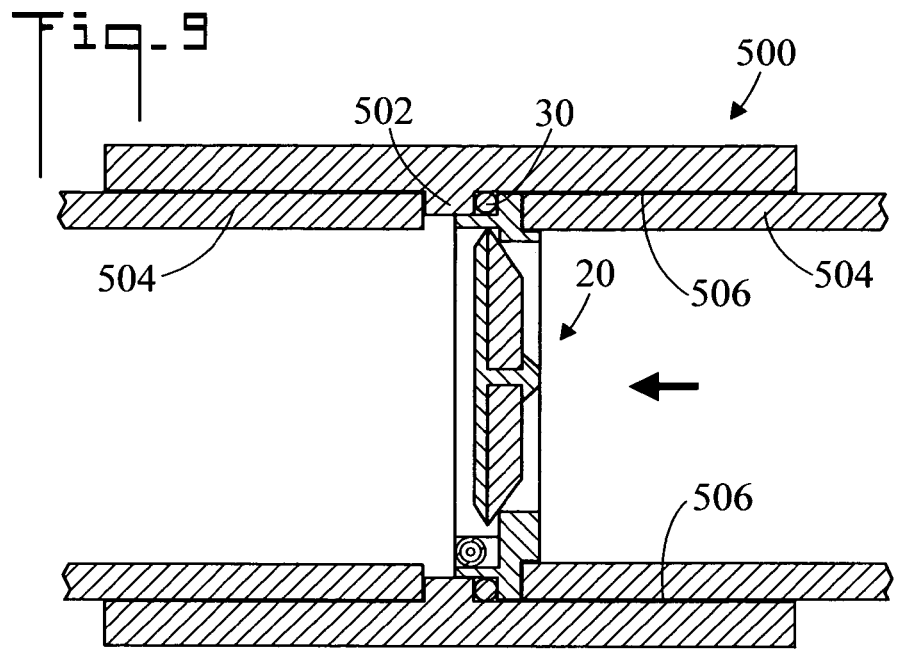
Fig_9
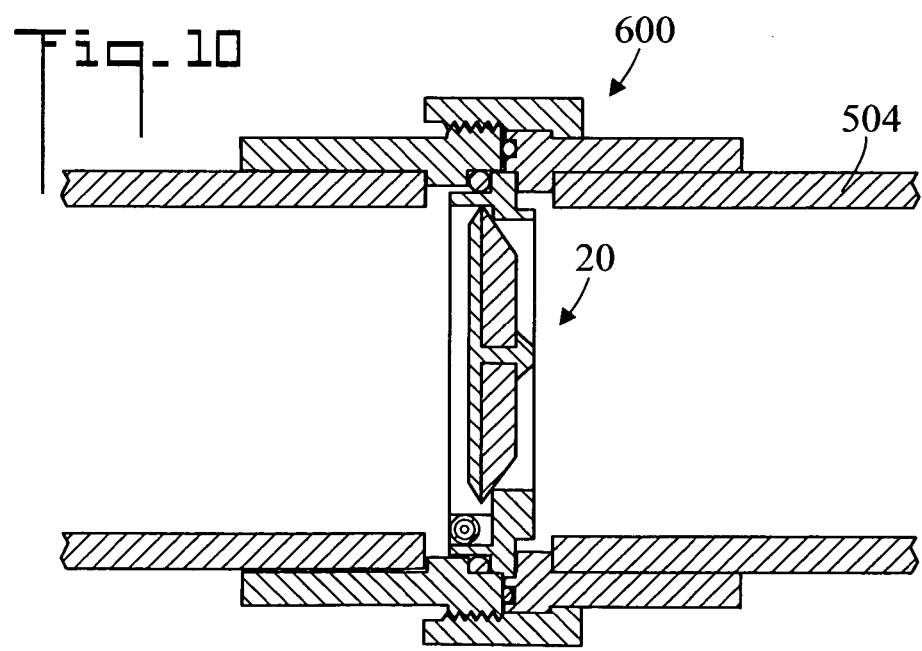
Fig_10

CHECK VALVE AND METHOD OF USE

CROSS REFERENCE TO RELATED APPLICATION

This application claims the filing benefit under 35 U.S.C. §119(e) of U.S. Provisional Application No. 60/997,790 filed Oct. 5, 2007, which is herein incorporated by reference.

TECHNICAL FIELD

The present invention pertains generally to check valves used in plastic pipe installations, and more particularly to a thin check valve which may be fitted into a standard pipe coupling.

BACKGROUND OF THE INVENTION

A check valve is a mechanical device which allows fluid (liquid or gas) flow in only one direction. Such valves are used to prevent the back flow of the fluid in numerous applications, such as plastic swimming pool plumbing, fountains, water displays, and the like. A problem arises however in that a check valve assembly requires longitudinal distance along the pipe which is not available in some installations.

BRIEF SUMMARY OF THE INVENTION

The present invention is directed to a thin check valve which can be inserted into a pipe coupling (such as a conventional plastic pipe coupling) before the pipe is attached to the coupling, thereby eliminating the necessity of an expensive and extra part (i.e. a conventional check valve assembly). Unlike existing check valves which require considerable length when installed, the present invention requires much less length to perform the same function. The check valve is permanently installed in the pipe coupling prior to gluing the pipe in place. The present invention can also be installed in a universal quick disconnect pipe joint and can easily be replaced. Additionally, the check valve of the present invention may be easily installed without the use of hand tools.

In accordance with a preferred embodiment of the invention, a check valve for a pipe coupling includes a body and a valve plate which is rotatably connected to the body. A spring biases the valve plate to a closed position. The check valve is shaped and dimensioned to be installable inside the pipe coupling.

In accordance with an aspect of the invention, the pipe coupling has an inner ridge, and when the check valve is installed in the pipe coupling, the check valve abuts the inner ridge of the pipe coupling.

In accordance with another aspect of the invention, the check valve is installable in the pipe coupling without the use of hand tools.

In accordance with another aspect of the invention, when in the closed position, the check valve has a diameter and a thickness. The diameter is at least three times the thickness.

In accordance with another aspect of the invention, the thickness is about 0.5 inches.

In accordance with another aspect of the invention, the check valve has a first central axis, the valve plate has a second central axis, and the second central axis is offset from the first central axis.

In accordance with another aspect of the invention, the pipe coupling has an inner ridge and an inner surface, and the body has a circumference. A circular seal is disposed around the circumference, so that when the check valve is installed in the pipe coupling, the circular seal abuts both the inner ridge and the inner surface of the pipe coupling.

Other aspects of the present invention will become apparent from the following detailed description, taken in conjunction with the accompanying drawings, which illustrate, by way of example, the principles of the invention.

BRIEF DESCRIPTION OF THE DRAWINGS

FIG. 1 is a side elevation view of a check valve in accordance with the present invention with the check valve in the closed position;

FIG. 2 is a front elevation view of the check valve in the closed position;

FIG. 3 is a rear elevation view of the check valve in the closed position;

FIG. 4 is a side elevation view of the check in a partially open position;

FIG. 5 is a front elevation view of the check valve in the partially open position;

FIG. 6 is a rear elevation view of the check valve in the partially open position;

FIG. 9 is a cross sectional view of the check valve installed in the pipe coupling;

FIG. 10 is a cross sectional view of the check valve installed in a quick disconnect coupling; and, FIG. 11 a reduced side elevation view of the check valve installed in a limited longitudinal distance.

DETAILED DESCRIPTION OF THE INVENTION

Figure 7:
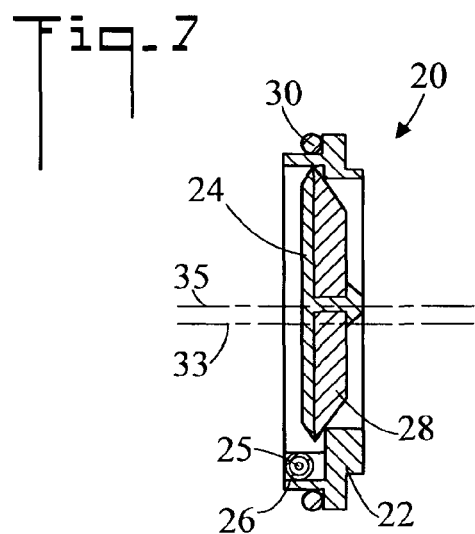
FIG. 7 is a cross sectional view of the check valve along the line 7-7 of FIG. 3.

Referring initially to FIGS. 1-3, there are illustrated side elevation, front elevation, and rear elevation views respectively of a check valve for a pipe coupling in accordance with the present invention, generally designated as 20. Check valve 20 includes a body 22, and a valve plate 24. Valve plate 24 is rotatably connected by pin 25 to body 22, and is biased by spring 26 to a closed position as shown in FIGS. 1-3. In the shown embodiment, valve plate 24 includes a seal 28 made from rubber or a similar material which abuts body 22 when check valve 20 is in the closed position. Check valve 20 is shaped and dimensioned to be installable inside a pipe coupling 500 (refer to FIGS. 8 and 9 and the associated discussions). When in the closed position, check valve 20 has a diameter D and a thickness T. In and embodiment of the invention, diameter D is at least three times thickness T, and diameter D can be as high as five times thickness T. As such, check valve 20 is much thinner than conventional check valve assemblies, and takes up little longitudinal distance along the pipe run (refer to FIG. 11 and the associated discussion). In an embodiment of the invention, thickness T is about 0.5 inches. Body 22 has a circumference C, and a circular seal 30 (such as an O-ring) is disposed around circumference C. It is noted that check valve 20 comprises a completely separate unit which may be installed into a conventional pipe coupling (refer to FIGS. 8 and 9 and the associated discussions).

FIGS. 4-6 are side elevation, front elevation, and rear elevation views respectively of check valve 20 in a partially open position. Fluid flow (indicated by arrow 32 in FIG. 4) overcomes the bias of spring 26 and causes valve plate 24 to swing open as shown by arrow 34. As the fluid velocity increases, valve plate 24 will open further.

FIG. 7 is a cross sectional view of check valve 20 along the line 7-7 of FIG. 3, showing body 22, valve plate 24, pin 25, spring 26, seal 28, and circular seal 30. Check valve 20 has a first central axis 33, and valve plate 24 has a second central axis 35. Second central axis 35 is offset from first central axis 33. In other words, valve plate 24 is not centered in check valve 20.

Figure 8:
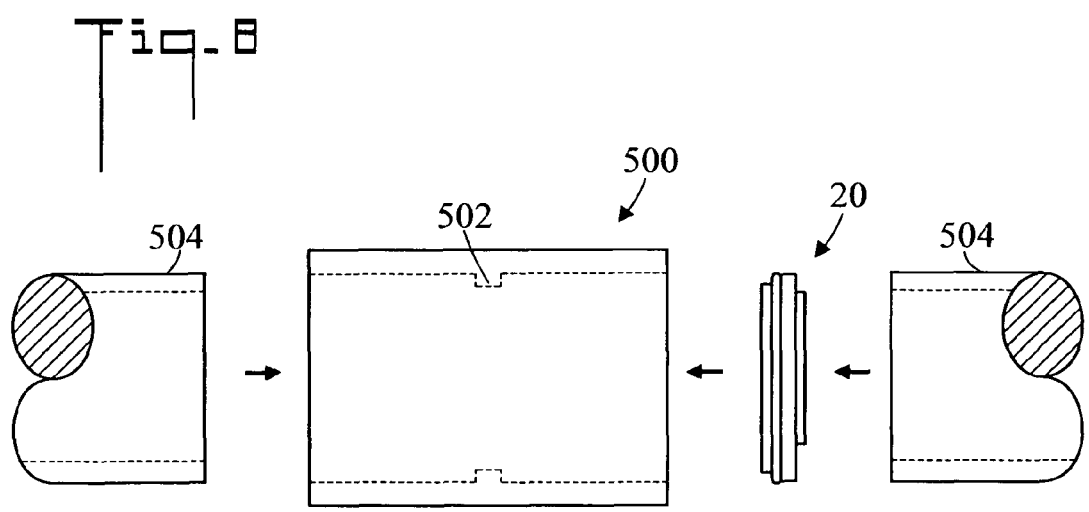
FIG. 8 is a reduced exploded side elevation view of the check valve being installed in a pipe coupling.

FIG. 8 is a reduced exploded side elevation view of check valve 20 being installed in a pipe coupling 500. Pipe coupling 500 is a conventional circular coupling which has a circular inner ridge 502. Check valve 20 is installed in pipe coupling 500 so that it is completely inside pipe coupling 500 and abuts inner ridge 502 (refer also to FIG. 9). Pipe 504 is then installed in pipe coupling 500 in the conventional manner, so that it abuts check valve 20, and is glued in place. It is noted that check valve 20 is installable in pipe coupling 500 without the use of hand tools such a wrenches or the like. As shown pipe coupling 500 is a straight coupling. However, it may be appreciated that other types of couplings such as 45° or 90° elbows could also be used.

FIG. 9 is a cross sectional view of check valve 20 installed in pipe coupling 500, showing check valve 20 abutting the inner ridge 502 of pipe coupling 500. Pipe coupling 500 has an inner surface 506. When check valve 20 is installed in pipe coupling 500, circular seal 30 abuts both inner ridge 502 and inner surface 506 thereby double sealing check valve 20 in place. It is noted that when installed, check valve 20 resides completely within pipe coupling 500. It is also noted that when glued in place, check valve 20 is locked between inner ridge 502 and pipe 504.

FIG. 10 is a cross sectional view of check valve 20 installed in a quick disconnect coupling 600. Check valve 20 resides within quick disconnect coupling 600, and is locked in place by the two coupling halves.

Figure 11:
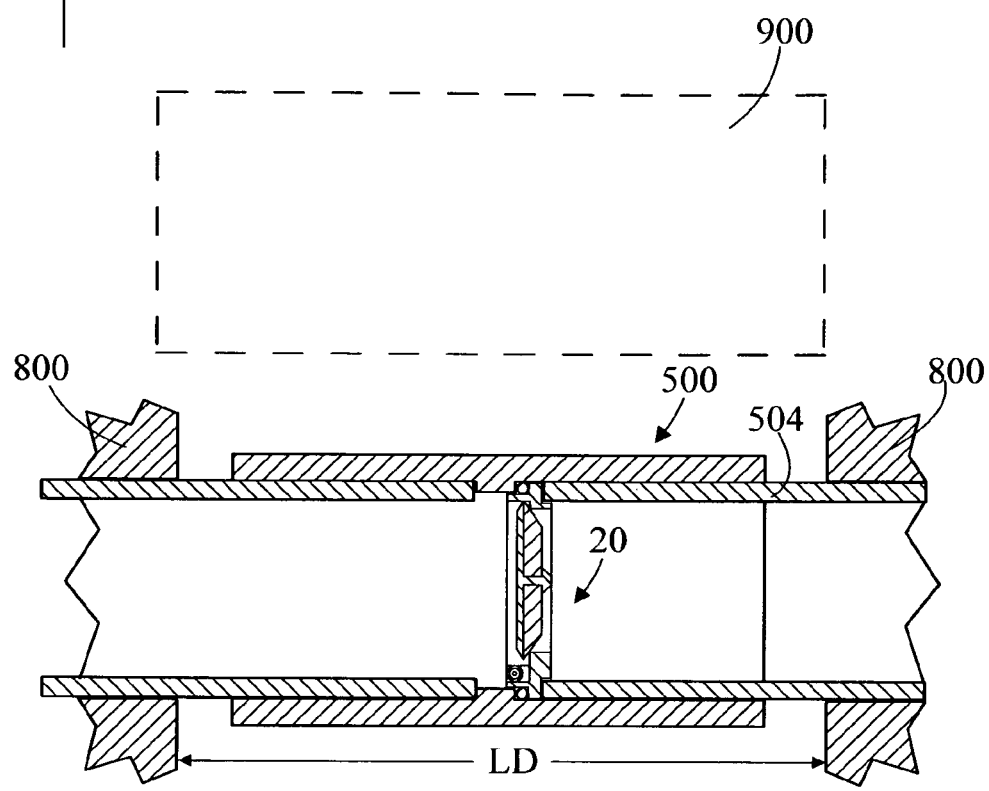

FIG. 11 a reduced side elevation view of check valve 20 installed in a limited longitudinal distance LD which is blocked on both ends by obstructions 800. As such, a conventional check valve assembly 900 is too long to be installed. However, the available longitudinal distance LD is sufficient to accommodate a conventional pipe coupling 500 with check valve 20 installed, since check valve 20 does not contribute to the length of pipe coupling 500 nor the length of the pipe run.

In terms of use, a method for installing a check valve 20 in a pipe coupling 500 includes: (refer to FIGS. 1-11)

(a) providing a pipe coupling 500 having an inner ridge 502;

(b) providing a pipe 504 which is shaped and dimensioned to be received by pipe coupling 500;

(c) providing a check valve 20 including;
a body; 22
a valve plate 24 rotatably connected to body 22;
valve plate 24 biased to a closed position; and,
check valve 20 shaped and dimensioned to be installable inside pipe coupling 500;

(d) installing check valve 20 in pipe coupling 500 so that check valve 20 is completely inside pipe coupling 500 and check valve 20 abuts inner ridge 502 of pipe coupling 500; and, (e) installing pipe 504 in pipe coupling 500 so that pipe 504 abuts check valve 20.

The method further including:
performing step (d) without the use of hand tools.

The method further including:
in step (d), sliding check valve 20 into pipe coupling 500 until it abuts inner ridge 502 of pipe coupling 500.

The method further including:
in step (a), pipe coupling 500 having an inner surface 506;

in step (c), body 22 having a circumference C;
in step (c), a circular seal 30 disposed around circumference C; and,
in step (d), circular seal 30 abutting both the inner ridge 502 and the inner surface 506.

The method further including:
in step (c), when in the closed position, check valve 20 having a diameter D and a thickness T; and,
diameter D being at least three times thickness T.

The method further including:
thickness T being about 0.5 inches.

A method for installing a check valve 20 in a limited longitudinal distance, includes:

(a) providing a limited longitudinal distance LD which is too short to accommodate the installation of a conventional check valve assembly 900;

(b) providing a pipe coupling 500 having an inner ridge 502;

(c) providing a pipe 504 which is shaped and dimensioned to be received by pipe coupling 500;

(d) providing a check valve 20 including;
a body 22;
a valve plate 24 rotatably connected to body 22;
valve plate 24 biased to a closed position; and,
check valve 20 shaped and dimensioned to be installable inside pipe coupling 500;

(e) installing check valve 20 in pipe coupling 500 so that check valve 20 is completely inside pipe coupling 500 and check valve 20 abuts inner ridge 502 of pipe coupling 500; and, (f) installing pipe 504 in pipe coupling 500 so that pipe 504 abuts check valve 20.

The preferred embodiments of the invention described herein are exemplary and numerous modifications, variations, and rearrangements can be readily envisioned to achieve an equivalent result, all of which are intended to be embraced within the scope of the appended claims.

I claim:

1. A method for installing a check valve in a pipe coupling:

(a) providing a conventional plastic pipe coupling having an inner surface and an entirely uniform inner diameter except for a centrally disposed inner ridge, said inner ridge having an upstream edge and an opposite downstream edge;

(b) providing a pipe which is shaped and dimensioned to be received by said pipe coupling;

(c) providing a check valve including;
a body;
a valve plate rotatably connected to said body;
said valve plate biased to a closed position;
said check valve shaped and dimensioned to be installable inside said pipe coupling;
when in said closed position said check valve having a thickness, said diameter being at least three times said thickness;
said body having a circumference;
a circular seal disposed around said circumference;
said check valve having a first central axis;
said valve plate having a second central axis;
said second central axis offset from said first central axis;
said check valve having a diameter such that when said check valve is installed in said pipe coupling said check valve abuts said inner surface of said pipe coupling;

(d) providing glue;

(e) sliding said check valve into said entirely uniform inner diameter portion of said pipe coupling so that said check valve is completely inside said pipe coupling and said check valve abuts said inner surface and said inner ridge of said pipe coupling such that said circular seal abuts both said upstream edge of said inner ridge and said inner surface of said pipe coupling; and, (f) using said glue to glue said pipe in place in said pipe coupling so that said pipe abuts said check valve.

2. A check valve system, comprising:

a conventional plastic pipe coupling having an inner surface and an entirely uniform inner diameter except for a centrally disposed inner ridge, said inner ridge having an upstream edge and an opposite downstream edge;

a pipe which is shaped and dimensioned to be received by said pipe coupling;

a check valve including;
   a body;
   a valve plate rotatably connected to said body;
   said valve plate biased to a closed position;
   said check valve shaped and dimensioned to be installable inside said pipe coupling;
   when in said closed position said check valve having a thickness, said diameter being at least three times said thickness;
   said body having a circumference;
   a circular seal disposed around said circumference;
   said check valve having a first central axis;
   said valve plate having a second central axis;
   said second central axis offset from said first central axis;
   said check valve having a diameter such that when said check valve is installed in said pipe coupling said check valve abuts said inner surface of said pipe coupling;

glue and;

wherein (1) said check valve is slid into said entirely uniform inner diameter portion of said pipe coupling so that said check valve is completely inside said pipe coupling and said check valve abuts said inner surface and said inner ridge of said pipe coupling such that said circular seal abuts both said upstream edge of said inner ridge and said inner surface of said pipe coupling, and (2) said pipe is glued in place in said pipe coupling so that said pipe abuts said check valve.

\* \* \* \* \*